UNITED STATES PATENT OFFICE.

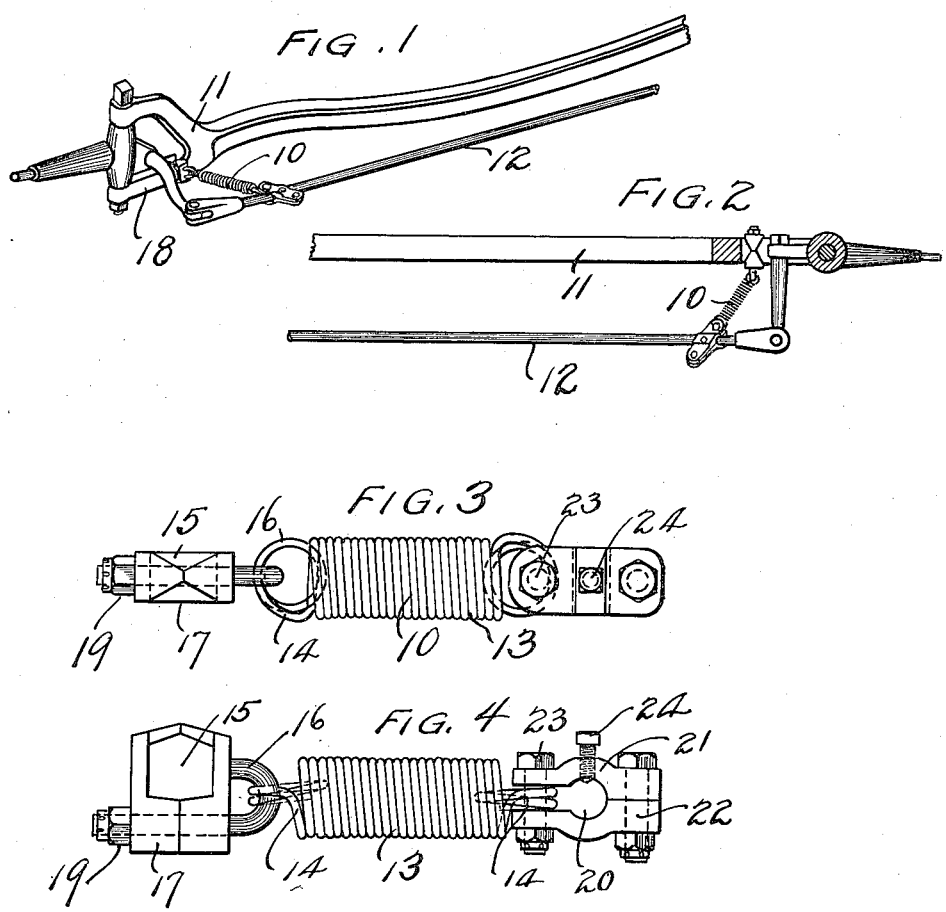

GEORGE W. MOCK, OF ROARING SPRING, PENNSYLVANIA.

AUTOMOBILE-STEERING-GEAR ATTACHMENT.

1,290,634. Specification of Letters Patent. Patented Jan. 7, 1919.

Application filed March 2, 1918. Serial No. 220,013.

*To all whom it may concern:*

Be it known that I, GEORGE W. MOCK, a citizen of the United States, residing at Roaring Spring, in the county of Blair and State of Pennsylvania, have invented certain new and useful Improvements in Automobile-Steering-Gear Attachments, of which the following is a specification.

This invention relates to automobiles, and has for its primary object improvements in the steering gear mechanism whereby the operator of a car on which said improvements are installed, is relieved of the usual jarring sensations that accompany the driving of cars having a short wheel base, and to this end this invention contemplates a stabilizing device, the action of which not only removes the jarring action from the steering wheel but at the same time makes the short wheel base car easy as well as safe to drive.

Another object of the device is to provide means whereby the usual rattling noise of the steering gear is dispensed with in addition to providing means whereby the front wheels of a short wheel base car are prevented from locking under the car, which feature is often the cause of serious mishaps.

With these and many other objects in view, which will be more readily apparent as the nature of the invention is better understood, the same consists of the various details of construction, combination, and arrangement of parts as will be hereinafter fully pointed out, illustrated and claimed.

It will be readily understood by those skilled in the art to which this invention belongs that the same is susceptible of some structural change or modification without departing from the spirit or scope of the invention but a preferred and thoroughly practical embodiment of the invention is shown in the accompanying drawings in which—

Figure 1 shows a perspective view of a portion of an automobile steering gear having the present invention applied thereto.

Fig. 2. shows a plan view of a portion of the above steering gear having the present invention applied thereto.

Fig. 3 is a plan view, in detail, of one of the steering gear attachments.

Fig. 4 is a side elevation of the parts shown in Fig. 3 of the drawings.

Similar reference numerals refer to similar parts throughout the several figures of the drawings.

In carrying out this invention no change is contemplated in the usual steering gear of the automobile and to this end I employ a tension device, designated in its entirety by the numeral 10, and which is adapted to be positioned between the lower jaw portion of the front axle 11, and the transverse steering rod 12. The tension device proper, preferably consists of a helical spring 13, having its ends 14 made into a double loop, as shown in Figs. 3 and 4 of the drawings, in order to give additional wearing surface for the spring end attachments, which not only adds durability but safety as well to the device.

The end attachment 15, consists essentially of an eye bolt 16, which is designed to engage the loop 14 in the end of the helical spring, and to pass through a split clamp 17 which is adapted to be placed over the lower jaw portion 18 of the front axle 11, as clearly shown in Fig. 2 of the drawings. For the purpose of drawing the clamp 17 on the axle there is provided a suitable nut 19. The opposite end of the tension device 13 is provided with an adjustable clamp 20, which is adapted to be positioned on the transverse steering rod 12 as shown in Figs. 1 and 2 of the drawings.

The clamp 20 is shown made in two parts 21 and 22, although it would be possible to make the same in one piece and have a bolt 22 for drawing the ends of the clamp together as well as to act as an anchor for the end 14 of the helical spring. For the purpose of keeping the clamp from moving on the rod 12 there is provided a set screw 24, which is adapted to pass through the top portion 21 of the clamp and engage the rod 12. Referring to Figs. 1 and 2 of the drawings it will be readily noticed that when the car operator is passing around a curve one of these tension devices will be lengthened while the other will be shortened, obviously the one on the inside of the curve will be lengthened while the one on the outside will be shortened, until the minimum length position is reached after which both springs will tend to hold the gear in such position that the front wheel can not become locked beneath the car causing frequent wrecks.

When the car is operating on a tangent the tension devices both tend to keep the front wheels in proper alinement for moving straight ahead, and minor obstacles such as small stones or rough roads do not affect the operation of the car, thus the usual arm fatigue that the operator notices is absent when operating a car with the device installed thereon.

With the above description together with the drawings it is believed that the many advantages of the herein described device will be readily apparent and what I claim and desire to be secured by Letters Patent is—

1. A stabilizing device for automobile steering gear including the combination with the axle fork and steering rod, of a coil spring, a fork engaging clamp for engaging one end of said spring and consisting of a pair of clamping members and a clamping bolt having a hooked end portion for engaging one end of the spring and also constituting the head of the bolt whereby when the nut thereof is tightened the members of the clamp will be caused to grip the axle fork, and a steering rod engaging clamp consisting of a pair of clamping members having an intermediate rod engaging portion and having one of their ends formed to provide a space therebetween when the members are bolted together on the steering rod, bolts for holding the members of the clamp together and one of said bolts constituting a support for one end of the coil spring, and a set screw carried by one of the members of the steering rod clamp for anchoring the same on the steering rod.

2. A stabilizing device for automobile steering gear including the combination with the axle fork and steering rod, of a coil spring having looped end portions, a clamp for engaging with the axle fork, a tensioning bolt for releasably engaging one looped end of the spring and placing the same under tension and also holding the members of said clamp together, and a two-part clamp for holding the other end of the spring to the steering rod including means for rigidly fixing the clamp on said rod and means for releasably engaging the spring.

In testimony whereof I affix my signature.

GEORGE W. MOCK.